UNITED STATES PATENT OFFICE.

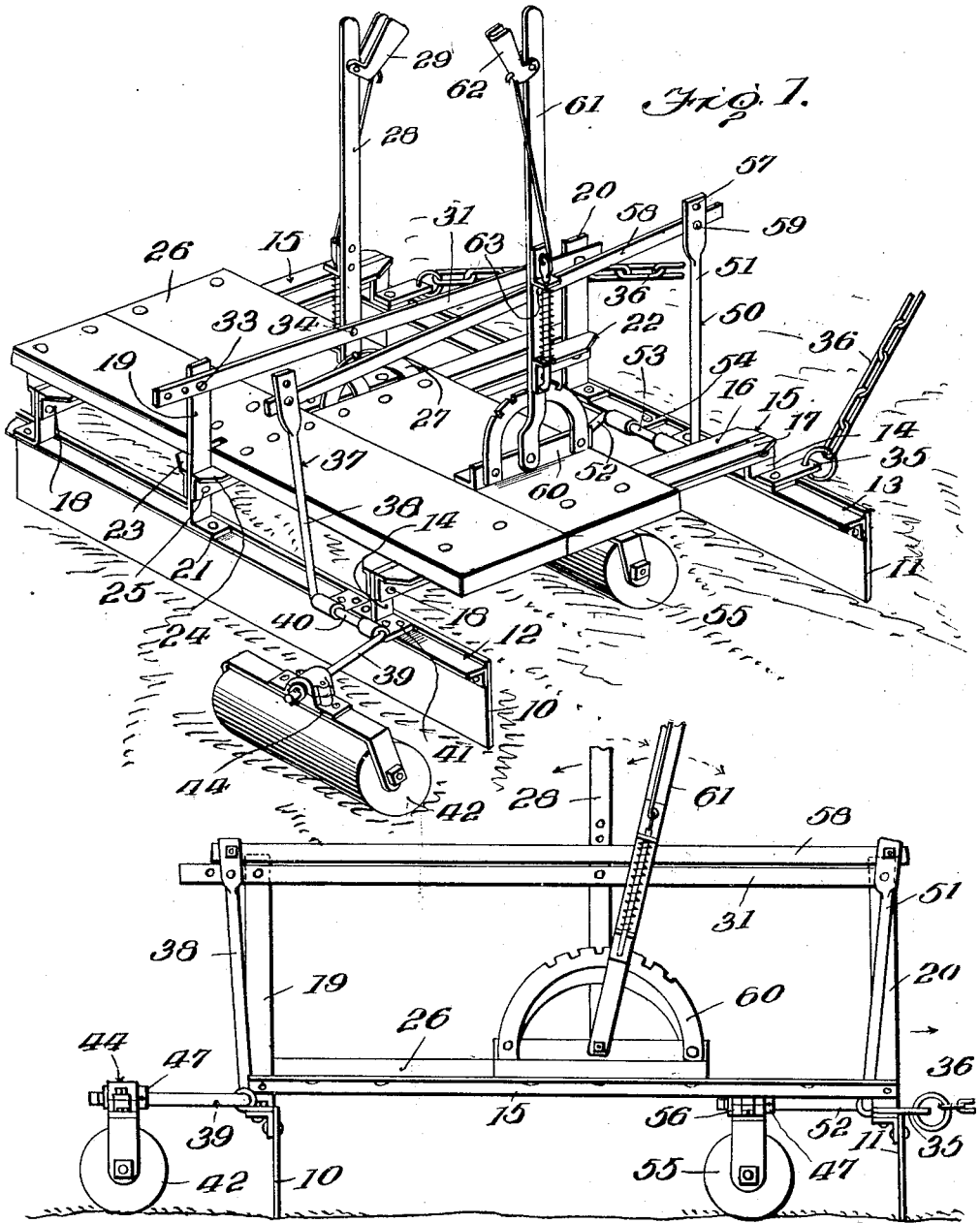

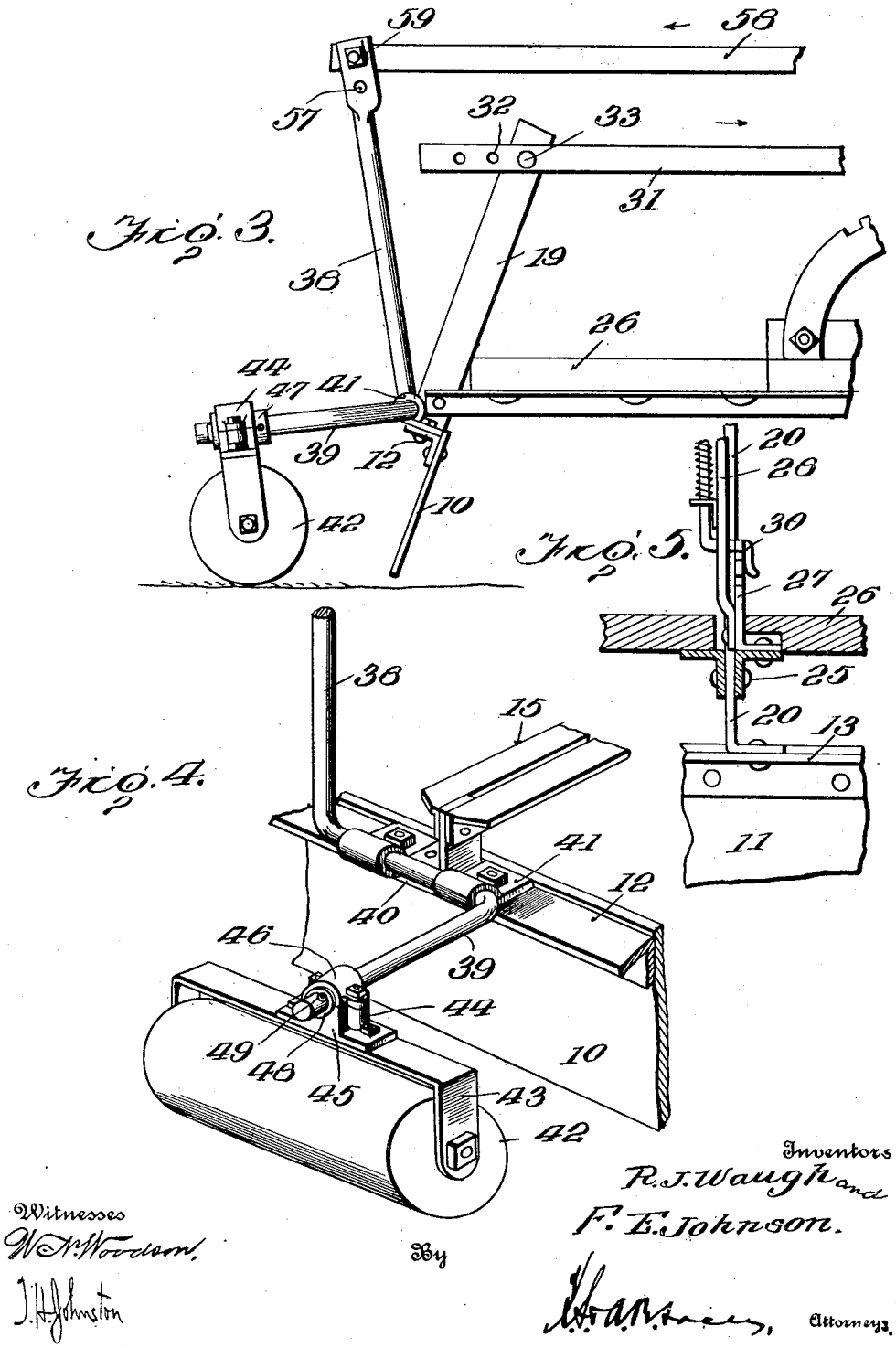

RICHARD J. WAUGH AND FRANK E. JOHNSON, OF ALMENA, KANSAS.

COMBINED SCRAPER AND ROLLER.

1,198,684.  Specification of Letters Patent.  Patented Sept. 19, 1916.

Application filed March 23, 1915. Serial No. 16,410.

*To all whom it may concern:*

Be it known that we, RICHARD J. WAUGH and FRANK E. JOHNSON, citizens of the United States, residing at Almena, in the county of Norton and State of Kansas, have invented certain new and useful Improvements in Combined Scrapers and Rollers, of which the following is a specification.

This invention contemplates an improved road scraper and roller and has as its primary object to provide a device of this character which will be adapted for use to crown the road and which will also be adapted to at the same time, roll or pack the loose earth to form the crown.

The invention has as a further object to provide a scraper wherein the blades thereof will be simultaneously adjustable to angular position relative to the vertical and wherein the rollers employed will also be simultaneously adjustable to operative position to contact with the ground or to inoperative position supported upon the scraper.

The invention has as a further object to so mount the rollers that the said rollers may be adjusted to move the scraper blades longitudinally into angular relation to the surface to be worked and wherein the adjustment of the said rollers in the manner set forth will, therefore, provide a corresponding adjustment for the scraper blades.

The invention has as a still further object to provide a construction wherein the angular adjustment of the blades relative to the vertical and the longitudinal adjustment thereof with relation to the surface to be worked, may be independently accomplished.

Other and incidental objects will appear as the description proceeds and in the drawings wherein I have illustrated the preferred embodiment of our invention and wherein similar reference characters designate corresponding parts throughout the several views.

Figure 1 is a perspective view of our improved device, Fig. 2 is a side elevation particularly illustrating the disposition of the rollers employed, Fig. 3 is a fragmentary side elevation showing the manner in which the scraper blades may be adjusted as well as the manner in which the rollers may be adjusted relative to the scraper blades, Fig. 4 is a fragmentary perspective view showing the mounting of one of the rollers, Fig. 5 is a fragmentary sectional view showing the mounting of the hand levers for shifting the scraper blades.

In the preferred embodiment of our invention as illustrated in the drawings, we preferably employ two relatively flat oblong scraper blades 10 and 11, and fixed to the rear faces of said blades adjacent the upper margins thereof are angle irons 12 and 13, which in length, are preferably equal to the length of the said blades. Connected to the angle irons 12 and 13 adjacent opposite extremities thereof, are substantially L-shaped brackets 14, one arm of each of which is secured in any suitable manner to the adjacent angle iron, while the other arm projects laterally therefrom at substantially right angles. Pivotally connecting the upstanding arms of the brackets 14 are transversely arranged cross-pieces 15 each of which is preferably formed from angle irons 16 and 17 secured to opposite faces of alined brackets 14 by pivot pins 18 with the laterally extending portions of said angle irons arranged in alinement and projecting in opposite directions.

Connected to the angle irons 12 and 13 substantially midway the ends thereof are upstanding lever arms 19 and 20 respectively. Each of said arms is preferably formed from a single length of metal bent adjacent one end to provide a terminal lug 21 which is connected to the adjacent angle iron by rivets or in any other desired manner. The lever arms 19 and 20 are arranged in alinement and pivotally mounted upon the said arms is a cross-piece 22 similar to the cross-pieces 15. As best shown in Fig. 1 of the drawings, the cross-piece 22 is also preferably formed from angle irons 23 and 24 connected to opposite sides of the lever arms 19 and 20 by pivot pins 25 with the laterally extending portions of the said angle irons arranged in a plane with the laterally extending portions of the irons 16 and 17. Mounted upon the cross-pieces 15 and 22 is a platform 26 which may be constructed of suitable planks riveted or otherwise secured to the said cross-pieces.

Mounted upon the cross-piece 22 preferably at a point substantially midway the ends thereof is a notched segment 27 best shown in Fig. 5 of the drawings and coacting with the said segment and pivotally connected thereto is a hand lever 28 which is provided with a hand latch 29 having a pawl 30 adapted to engage the segment in the well known manner. Adjustably connecting the lever arms 19 and 20 and pivotally mounted thereon is a rod 31. The connecting rod 31 adjacent one extremity thereof, is provided with a series of longitudinally spaced openings 32 best shown in Fig. 3 of the drawings, which are each adapted to receive a pivot pin 33, pivotally connecting the rod with the adjacent arm. By this construction, the inclination of the blades 10 and 11 relative to each other may be readily regulated in a manner which will be easily understood.

The rod 31 is pivotally connected to the lever arm 28 by a suitable pivot pin 34. It will thus be seen that when the hand lever is moved upon its pivot, the blades 10 and 11 will be simultaneously shifted into angular relation relative to the vertical in the manner best shown in Fig. 3 of the drawings. Connected to the angle iron 13 and preferably to the adjacent brackets 14 mounted thereon, are anchoring plates 35 which at the free extremities thereof are provided with openings which freely receive a suitable chain or other flexible element 36 through the medium of which draft may be applied to the device.

Mounted upon the angle iron 12 of the rear blade 10 of the scraper is a bell crank lever 37 which is offset intermediate its ends and the arms 38 and 39 of which are connected by a shank 40. As best shown in Fig. 4 of the drawings, the shank 40 is substantially straight and is pivotally connected with the angle iron 13 by spaced brackets 41. The brackets 41 are each preferably formed from a single strip of suitable sheet metal bent adjacent one extremity to freely embrace the shank 40, while the opposite extremity of each of said strips is bolted or otherwise secured to the angle iron 13. As best shown in Fig. 1 of the drawings, the lever 37 is mounted adjacent one extremity of the scraper, being arranged at the rear end of the contiguous terminal cross-piece 15 with the arm 38 projecting upwardly above the platform 26 and with the arm 39 projecting rearwardly upon one side of the blade 10.

Freely connected to the arm 39 adjacent the outer free terminal thereof is a roller or ground engaging member 42 which is rotatably supported upon a yoke 43, a shaft extending through the roller and being suitably connected to the arms of the said yoke. Mounted upon the yoke 43 is a bearing block 44 which is formed of bearing sections 45 and 46, the section 45 being preferably detachably connected to the yoke 43 while the section 46 is also preferably detachably connected to the section 45 by bolts as illustrated, or in any other suitable manner. The sections 45 and 46 of the bearing block 44 freely receive the adjacent terminal of the arm 39 which extends through the said bearing block, the bearing block being arranged to abut a stop collar 47 mounted upon the arm. Mounted upon the adjacent terminal of the arm is a washer 48 and a suitable cotter pin 49 is preferably employed in detachably connecting the roller with the said arm as best shown in Fig. 4 of the drawings. It will be observed that the roller 42 is adjustable in a vertical plane through the medium of the lever 37 and is also mounted to turn about the arm 39 as an axis, so that it will readily conform to an unevenness in the road surface.

Pivotally mounted upon the angle iron 13 carried by the blade 11 is a bell crank lever 50 identical in construction with the bell crank lever 37 and including arms 51 and 52 which are connected by a shank 53. The shank 53 is pivotally connected with the angle iron 13 by longitudinally spaced brackets 54 similar to the brackets 41. The lever 50 is arranged with the arm 51 thereof projecting upwardly in substantial alinement with the arm 38 of the lever 37, but it will be noted that the shank 53 of the lever 50 is arranged to extend in a direction opposite to that of the shank 40 of the lever 38. The roller or ground engaging member 55 which is mounted upon the arm 52 of the lever 50 is thus arranged in staggered relation to the roller 42 so that the full effect of each of the rollers will be utilized. The roller 55 is identical in construction with the roller 42 and is similarly mounted, the said last mentioned roller being provided with a bearing block 56 similar to the block 44, the block 56 swingingly connecting the roller with the arm 52.

The upper free terminals of the arms 38 and 51 are flattened and are each provided with a plurality of vertically spaced openings 57. Extending between the said arms is a rod 58 which is detachably and pivotally connected therewith by suitable pivot pins 59 engaging within corresponding openings of the series of openings 57. By this arrangement, it will be observed that the extremities of the connecting rod 58 are independently adjustable vertically of the arms 38 and 51.

Bolted or otherwise secured to the platform 26 is a notched segment 60 to the cross piece of which is pivotally connected a hand lever 61. Carried by the said lever and coöperating with the segment 60 is a latch 62 similar in construction to the latch 29. The lever 61 is detachably and pivotally connected to the rod 59 by a suitable pivot pin 63 and it will be observed that the rollers 42 and 55 may thus be simultaneously adjusted in a vertical plane relative to the blades 10 and 11.

Particular attention is now directed to the fact that the rollers 42 and 55 are arranged adjacent one end of the scraper so that, in use, by properly adjusting the said rollers, the adjacent ends of the blades 10 and 11 will be caused to clear the ground. In this way, the blades 10 and 11 may be adjusted longitudinally into angular relation to the surface to be worked, and when so adjusted, the scraper may be readily used to crown a road while the rollers 42 and 55 will roll or pack the loose earth thrown up by the said blades.

It will be noted that the rollers 42 and 55 are movable to a position wherein but a small portion of the length of the blades 10 and 11 adjacent the extremities thereof remote from the rollers will contact with the ground so that the said blades may be caused to dig into the ground while, on the other hand, the rollers are movable to a position to entirely clear the ground or other surface to be worked.

It will therefore be seen that we provide a very simple and efficient construction for the purpose set forth and wherein in use, the device may be used either as a scraper or as a combined scraper and roller, as exigency may demand.

Having thus described our invention, what we claim and desire to secure by Letters Patent is:—

1. A device of the character described including pivotally connected blades, means operatively connected to said blades for shifting the blades relative to the vertical, ground engaging members swingingly supported by adjacent ends of the blades, and means for swinging the said members relative to the blades for tilting the blades longitudinally.

2. A device of the character described including pivotally connected blades, lever arms carried by the said blades, means connecting the said arms, means operatively connected to said last mentioned means for shifting the blades relative to the vertical, and coacting smoothing rollers operatively supported by the blades at adjacent extremities thereof and swingingly shiftable relative to the blades for tilting the blades longitudinally.

3. A device of the character described including pivotally connected blades, means for shifting the said blades relative to the vertical, coacting ground engaging members swingingly connected to said blades at adjacent extremities thereof, means connecting said blades, and means operatively engaging said last mentioned means for shifting the said members to tilt the blades longitudinally.

4. A device of the character described including pivotally connected blades, means for shifting the blades relative to the vertical, coacting ground engaging members arranged in staggered relation at adjacent extremities of the blades and adapted to provide smoothing rollers, and means for simultaneously actuating said members for tilting the blades longitudinally.

5. A device of the character described including coacting blades, bell crank levers carried by said blades, each of said levers being integrally formed with one arm thereof projecting upwardly and the other arm projecting rearwardly relative to the blades, said members being offset intermediate their ends to provide shanks, brackets swingingly connecting said shanks with the blades, smoothing rollers carried by the rearwardly projecting arms of said levers, and means operatively engaging the upwardly projecting arms of the levers for shifting the rollers relative to the blades to tilt the blades longitudinally.

6. A device of the character described including coacting blades, cross pieces pivotally connecting said blades, lever arms carried by the blades, a rod pivotally connected to said arms, a cross piece extending between said lever arms, a hand lever pivotally mounted upon said last mentioned cross piece and pivotally connected to said connecting rod for simultaneously shifting the blades relative to the vertical, and coacting ground engaging members swingingly mounted upon the blades and shiftable relative thereto for tilting the blades longitudinally.

7. A device of the character described including blades, levers swingingly connected to said blades, ground engaging members swingingly mounted upon said levers, a rod pivotally connecting the levers, and a hand lever pivotally connected to said rod for simultaneously swinging said members to tilt the blades longitudinally.

8. A device of the character described including pivotally connected blades, means for shifting the blades relative to the vertical, ground engaging members carried by the blades at adjacent extremities thereof, and means operable independently of said first mentioned means for actuating said ground engaging members to tilt the blades longitudinally.

9. A device of the character described including coacting blades, ground engaging members swingingly mounted upon the blades, and means for shifting the said members relative to the blades for lifting adjacent ends of the blades, the said members being adapted to provide smoothing rollers and being mounted to swing into angular relation to the blades longitudinally thereof.

In testimony whereof we affix our signatures in presence of two witnesses.

RICHARD J. WAUGH. [L. S.]
FRANK E. JOHNSON. [L. S.]

Witnesses:
 JAMES HEMPHILL,
 R. W. HEMPHILL.

Copies of this patent may be obtained for five cents each, by addressing the "Commissioner of Patents, Washington, D. C."